United States Patent [19]

Mauthe

[11] Patent Number: 5,098,228

[45] Date of Patent: Mar. 24, 1992

[54] DESTRUCTIBLE CARTRIDGE FOR SECURING ANCHOR MEMBER

[75] Inventor: Peter Mauthe, Türkheim, Fed. Rep. of Germany

[73] Assignee: Hilti Aktiengesellschaft, Fürstentym, Liechtenstein

[21] Appl. No.: 492,621

[22] Filed: Mar. 13, 1990

[30] Foreign Application Priority Data

Mar. 22, 1989 [DE] Fed. Rep. of Germany ....... 3909428

[51] Int. Cl.$^5$ ............................................. E21D 20/02
[52] U.S. Cl. .................................. 405/259.6; 206/219; 405/259.5
[58] Field of Search ................. 405/261, 260; 206/219, 206/220; 52/704; 411/15

[56] References Cited

U.S. PATENT DOCUMENTS

| 3,921,800 | 11/1975 | Burns | 405/261 X |
| 4,263,832 | 4/1981 | Lang et al. | 405/261 X |
| 4,840,524 | 6/1989 | Bisping et al. | 405/261 X |

FOREIGN PATENT DOCUMENTS

| 2500053 | 8/1982 | France | 405/261 |
| 1293620 | 10/1972 | United Kingdom | 405/261 |
| 2084278 | 4/1982 | United Kingdom | 405/261 |

*Primary Examiner*—Dennis L. Taylor
*Attorney, Agent, or Firm*—Toren, McGeady & Associates

[57] ABSTRACT

A cartridge for securing anchor members in a borehole in a hard receiving material holds separated components of a hardenable mass. The cartridge is formed of an axially extending outer casing enclosing an inner casing forming separate compartments within the outer casing. A first hardenable mass component is contained within the outer casing about the inner casing which holds a second component. In addition, filler material can be included in one of the components. An axially extending jacket of a foam material laterally encloses the outer casing. The jacket fills the space in a borehole between the outer casing and the borehole wall. The outer surface of the jacket has axially extending grooves for the outflow of water when the cartridge and jacket is inserted into a borehole. Further, the jacket serves to temporarily hold the cartridge in a borehole.

15 Claims, 1 Drawing Sheet

DESTRUCTIBLE CARTRIDGE FOR SECURING ANCHOR MEMBER

BACKGROUND OF THE INVENTION

The present invention is directed to a destructible cartridge for securing an anchor member in a borehole with the cartridge having separate compartments each containing a component of a multi-component hardenable mass. A jacket of radially deformable material laterally encloses the cartridge.

An anchor member, secured by a hardenable mass of the above-mentioned type, is disclosed in U.S. Pat. No. 4,659,258, and such anchor members are used in rock, masonry and concrete. The jacket surrounding the cartridge serves as a preliminary mechanical anchor for the anchor member until the mass hardens. No bonding connection between the anchor rod and the borehole occurs in the region of the jacket. As a result, the region of the anchor rod secured by the hardenable mass is reduced by the length of the jacket. This factor leads to a reduction in the anchoring value.

Attaching anchor members using a hardenable mass has been used for some time in underwater work. In such work, there is the problem that the water contained in the borehole must be removed as completely as possible to prevent any reduction in the strength of the hardenable mass. Accordingly, it has been known to introduce additional hardenable mass into the borehole before the insertion of the cartridge. As a result, water remaining in the borehole is displaced by the insertion of the cartridge. This process, however, is cumbersome and time-consuming. Moreover, since visibility in underwater work is very limited, the introduction of the hardenable mass is often quite difficult.

SUMMARY OF THE INVENTION

The primary object of the present invention is to provide a destructible cartridge for securing anchor members in boreholes where the removal of water from the borehole is effected out-in a simple manner.

In accordance with the present invention, a jacket formed of a foam material or fiber is placed around the cartridge. Such a jacket made of foam material or fiber is relatively easy to destroy or break up after the insertion of the cartridge into a borehole when the anchor member is driven in. As a result, it is assured that an adequate adhesive connection of the hardenable mass with the borehole wall is obtained. The jacket can also be chemically dissolved in the hardening mass.

It is preferable if the jacket is formed of a polyurethane foam. Polyurethane foam, such as used in forming the jacket, including preferred hard foam materials, are described in the Ullmann Encyclopedia of Technical Chemistry, 4th Edition, Volume 19, pages 317-326.

Additional preferred materials for the jacket include a polyisocyanurate foam, a special polyurethane foam product. Moreover, it is also advantageous to use an epoxide resin foam for the jacket, especially epoxide resins hardened with polyamines, polyamides, polyimidazolines or ketimines. Furthermore, it is advantageous to utilize foams hardened as radicals for the jacket. Foams on the basis of UP, MMA and on an epoxyacrylate basis belong to this group. In still another preferred form, the jacket is made of a silicone foam. Foamed two component silicone or quasi-single component systems can be used for this purpose. All the above-mentioned foamed materials and their fabrication are known (compare for instance Ullmann, Encyclopedia of Technical Chemistry, 4th Edition, Volume 15, Page 442 and Volume 20, page 418).

The purpose of the jacket is to displace excess water present in the borehole. Therefore, it is advantageous that the foam structure of the jacket be a closed cell structure. With a closed cell structure, the water absorbed by the foamed material is minor. In certain applications, however, open cell foam structures are also feasible.

When the cartridge and jacket is introduced into the borehole, excess water is displaced out of the borehole. As a result, it is advantageous for the jacket to contain axially extending grooves on its radially outer surface. Such grooves permit the water to flow out of the borehole, with water being displaced by the cartridge out of the deepest regions of the borehole. Jackets formed of hard foams are preferable since broken pieces of the foam can be used as filler material.

In another advantageous embodiment of the present invention, the jacket is formed of a fiber material or comprises at least one layer containing fibers. The fibers can be relatively long and, during introduction of the cartridge into the borehole, can rest elastically at the radially outer circumferential wall of the cartridge. If short fibers are present in the region of the borehole surface, they can extend outwardly in a brush-like manner and provide a temporary mechanical anchoring of the cartridge. It is also possible to use fiber fleece. Apart from natural materials, synthetic materials such as nylon, can be used.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
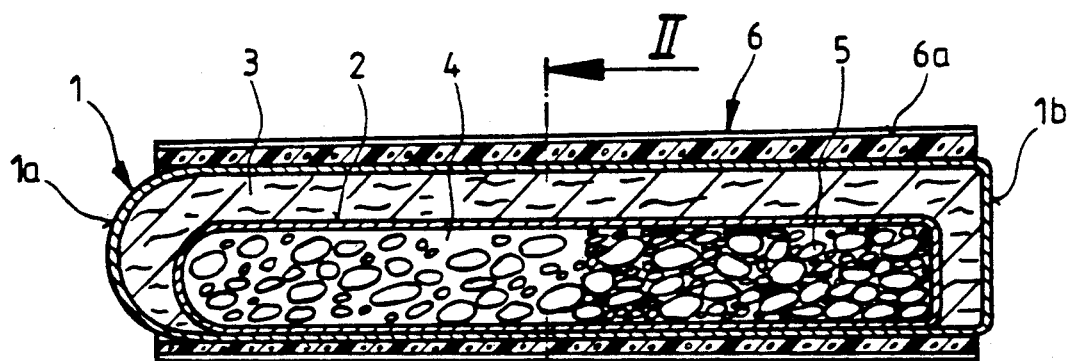
FIG. 1 is an axially extending sectional view of a cartridge embodying the present invention.
Figure 2:
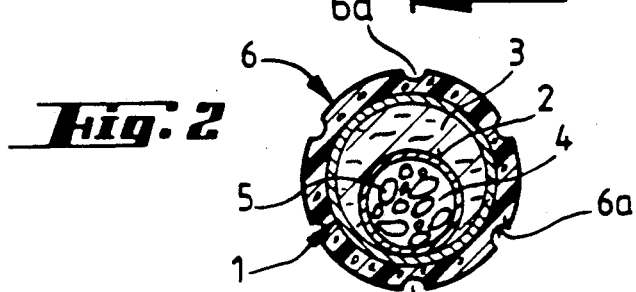
FIG. 2 is a cross-sectional view through the cartridge taken along the line II—II in FIG. 1.
Figure 3:
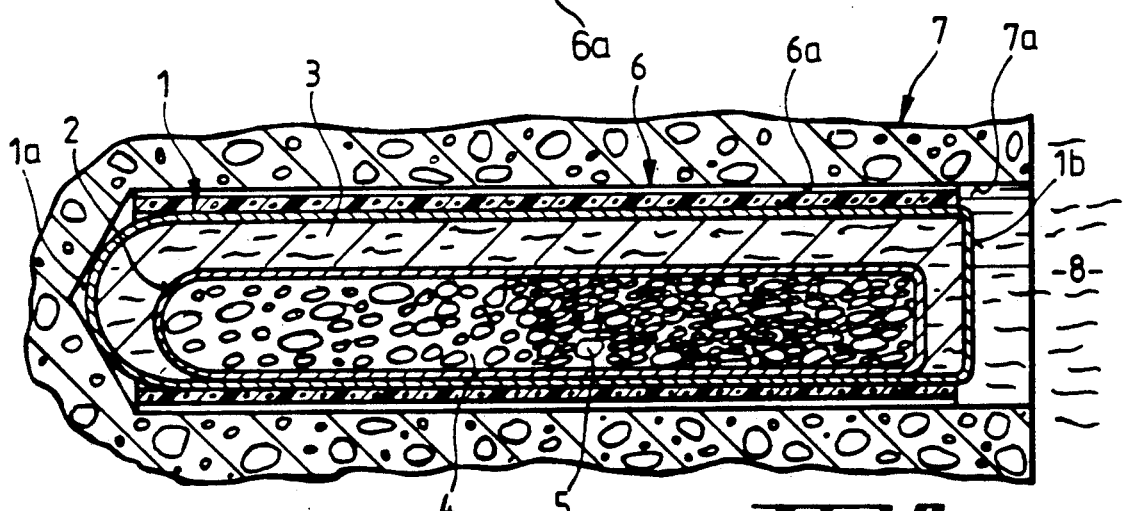
FIG. 3 is a sectional view similar to FIG. 1 illustrating the cartridge inserted into a borehole.
Figure 4:
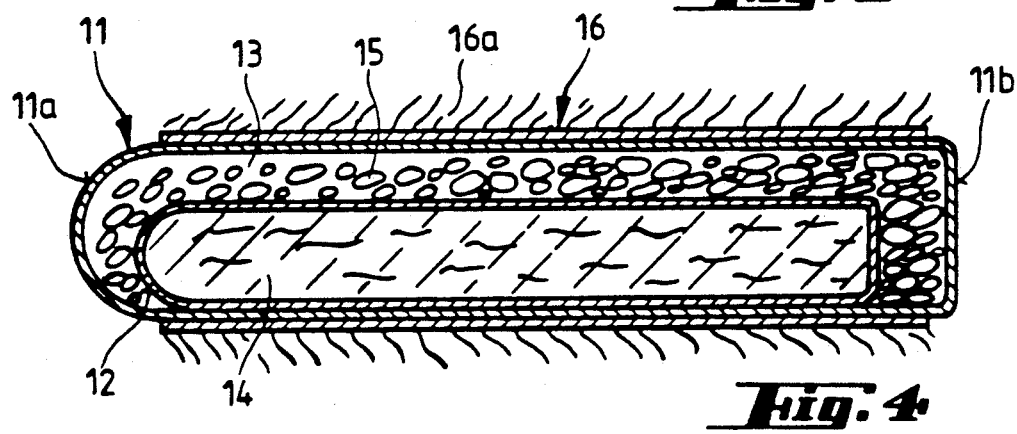
FIG. 4 is an axially extending section of another embodiment of a cartridge formed in accordance with the present invention.

In FIGS. 1, 2 and 3, a cartridge is shown formed of an axially extending outer casing 1 with an inner casing 2 arranged within it. Outer casing 1 has a front end 1a facing in the setting or insertion direction and a rear end 1b spaced axially from the front end and facing in the opposite direction. Front end 1a of the outer casing 1 is rounded facilitating the introduction of the cartridge into a borehole. The outer casing 1 contains a first component 3 of a two-component hardenable mass. The mass hardens after the components are mixed. The first component is located exteriorly of the inner casing 2. A second component 4 is enclosed within the inner casing 2 and held separate from the first component 3. In addition to the second component 4, the inner casing 2 also contains filler materials 5. Preferably, filler materials are grains of quartz sand with the surface thereof covered by a hardener serving as the second component 4. A sleeve-like or tubular jacket 6, formed of a foamed material, is slid onto the outer surface of the outer casing 1 and extends in the axial direction of the casing. As can be seen in FIGS. 1, 3 and 4, the jacket 6 extends from the front end 1a to the rear end 1b of the outer casing 1. Jacket 6 has an outside diameter tapering inwardly in the insertion direction. Further, jacket 6 has axially extending grooves 6a in its radially outer surface. The grooves 6a afford the escape of water displaced by the cartridge when it is introduced into a borehole containing water.

In FIG. 3, the cartridge is inserted into a borehole 7a in a receiving material 7. The borehole 7a in the receiving material has a diameter corresponding approximately to the outside diameter of the jacket 6. When the cartridge is inserted into the borehole 7a, water is displaced out of the borehole by the cartridge. The water flows out of the borehole through the grooves 6a, extending in axial direction. After the cartridge is inserted into the borehole 7a, it is broken up or destroyed by the introduction of an anchor member, such as an anchor rod, and the components 3 and 4 within the cartridge are mixed together. Preferably, the jacket is formed of a material which is destroyed or broken up during the insertion of the anchor member, whereby an adhesive connection with the wall of the borehole is achieved.

In FIG. 4 another cartridge is displayed corresponding essentially to the cartridge illustrated in FIGS. 1 to 3. This cartridge is formed of an outer casing 11 enclosing an inner casing 12. Outer casing 11 has a front end 11a facing in the insertion direction and a rear end 11b. The outer casing 11 holds a first component 13, while the inner casing 12 holds a second component 14 separated from the first component. As distinguished from the embodiment in FIGS. 1 to 3, filler materials 15 are contained within the outer casing 11. A jacket 16 is fitted over the radially outer surface of the outer casing 11 and the radially outer surface of the jacket contains fibers 16a. Fibers 16a serve for displacing the water out of the borehole as the cartridge is inserted into the borehole. The fibers 16a can also be attached directly to the outer casing 11.

I claim:

1. A destructible axially extending cartridge for securing an anchor member in a borehole in a receiving material, said cartridge comprising an axially extending outer surface and an interior space, said cartridge having a front end and a rear end spaced apart in the axial direction thereof, means within said interior space for dividing the interior space into at least two separate compartments, and a tubular jacket of a radially deformable material having a radially inner surface in fully surface contact with and laterally enclosing the outer surface of said cartridge from the front end to the rear end thereof, and said jacket has a radially outer surface with an outside diameter approximately equal to the borehole diameter.

2. A destructible cartridge, as set forth in claim 1, wherein said jacket is formed of a foam material.

3. A destructible cartridge, as set forth in claim 1, wherein said jacket is formed of a fiber material.

4. A destructible cartridge, as set forth in claim 2, wherein said jacket is formed of a polyurethane foam material.

5. A destructible cartridge, as set forth in claim 2, wherein said jacket is formed of a polyisocyanurate foam material.

6. A destructible cartridge, as set forth in claim 2, wherein said jacket is formed of an epoxide resin foam material.

7. A destructible cartridge, as set forth in claim 2, wherein said jacket is formed of a foam material hardened as a 8. A destructible cartridge, as set forth in claim 2, wherein said jacket is formed of a silicone foam material.

9. A destructible cartridge, as set forth in claim 2, wherein said foam material is a closed cell foam material.

10. A destructible cartridge, as set forth in claim 1, wherein the radially outer surface of said jacket comprises grooves extending in axial direction.

11. A destructible cartridge, as set forth in claim 2, wherein the foam material is a hard foam material.

12. A destructible cartridge, as set forth in claim 3, wherein said jacket has at least one layer comprising 13. A destructible cartridge, as set forth in claim 12, wherein said jacket has a radially outer surface with fibers formed on and extending outwardly from the outer surface thereof.

14. A destructible cartridge, as set forth in claim 1, wherein said cartridge comprises an axially extending outer casing and an axially extending inner casing located within said outer casing and separating the interior of said outer casing into said separate compartments.

15. A destructible cartridge, as set forth in claim 1, wherein said jacket tapers inwardly from adjacent said second end to adjacent said first end of said cartridge.

* * * * *